(12) United States Patent
Hausdorf et al.

(10) Patent No.: US 6,281,259 B1
(45) Date of Patent: *Aug. 28, 2001

(54) SPONGE CLOTH

(75) Inventors: Jörg Hausdorf, Fürth; Eberhard Link, Dornhan, both of (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/234,257

(22) Filed: Jan. 20, 1999

Related U.S. Application Data

(62) Division of application No. 08/876,573, filed on Jun. 16, 1997, now Pat. No. 5,910,275.

(30) Foreign Application Priority Data

Jun. 14, 1996 (DE) .............................. 196 23 704

(51) Int. Cl.⁷ .............................. A47K 7/02; A47L 13/16
(52) U.S. Cl. .......................... 521/84.1; 15/244.1
(58) Field of Search .............................. 15/244.1, 244.3, 15/244.4; 521/84.1

(56) References Cited

U.S. PATENT DOCUMENTS 1,142,619 * 6/1915 Pum et al. .............................. 264/49

FOREIGN PATENT DOCUMENTS 2 284 421 * 6/1995 (GB) .

OTHER PUBLICATIONS

Kirk–Othmer Encyclopedia of Chemical Technology, Third Edition, vol. 5, pp. 118–129, 1980.*

* cited by examiner

*Primary Examiner*—Allan R. Kuhns
(74) *Attorney, Agent, or Firm*—Kenyon & Kenyon

(57) ABSTRACT

A sponge cloth of decrystallized cellulose modified by the acetyl group content, where the average degree of substitution is 0.2 to 1.5. The cloth does not contain any organic or inorganic sulfur compounds. The sponge cloth is produced by treating wood pulp with sodium hydroxide solution, then treating it with acetylating substances, drying and dissolving in an organic solvent with the addition of a pore-forming salt, fibers and optionally pigment dyes and foaming agents, spreading the mixture on a web and boiling in water with subsequent drying to form a finished cloth.

5 Claims, No Drawings

SPONGE CLOTH

This application is a division of application Ser. No. 08/876,573, filed Jun. 16, 1997, now U.S. Pat. No. 5,910,275.

BACKGROUND OF THE INVENTION

1. Field of the Invention

The invention relates to a sponge cloth made of cellulose and a process for producing same.

2. Description of Related Art

The publication Ullmann's Encyklopädie der technischen Chemie [Encyclopedia of Industrial Chemistry], $3^{rd}$ edition (1967) vol. 18, pp. 175–177, describes a process for producing a spongy cellulose structure where layers of pulp obtained from wood are swollen in a 15–20% NaOH solution that is present in excess. Sodium cellulose is formed after a period of time. The sodium hydroxide solution is then squeezed out; it contains dissolved hemicelluloses that would otherwise interfere with the subsequent process steps. The remaining pressed cake in ground form is treated with carbon disulfide, forming cellulose xanthogenate, which dissolves readily in a NaOH solution, in which it degrades after a period of time with a reduction in average degree of polymerization (DP). Depending on the grade of pulp used and the storage time, the DP is reduced from 800–1200 to 200–600.

The DP is defined as the average number of individual cellulose molecules of which a cellulose polymer chain is composed on the average.

The alkaline xanthogenate solution is then mixed with pore-forming Glauber's salt, cotton fibers and optionally a coloring pigment and the mixture is stirred or kneaded until all the components are distributed uniformly. Then the mixture is spread on a web by means of a flat device or a roller-like device. The web may have a three-dimensional pattern for profiling the surface of the product.

The mass on the web is guided for a few minutes in an alkaline coagulation bath enriched with Glauber's salt at 100 C. The xanthogenate is thermally cleaved and the pore-forming salt is leached out, forming a spongy structure as the sheet product on the web. The sheet product is washed in water and brought in contact with a small amount of 1% sulfuric acid solution to reduce the residual levels of organic carbon disulfide and hydrogen sulfide compounds.

SUMMARY OF THE INVENTION

The object of the invention is to provide a sponge cloth and a process for producing same, where the above-mentioned sulfur compounds, in particular carbon disulfide and hydrogen sulfide, are not present in the sponge cloth at all. Another object of this invention is to prevent a reduction in average degree of polymerization DP of the cellulose during the production of the sponge cloth, to achieve higher strength values and increase the storage stability of the cellulose derivatives.

These and other objects of the invention can be achieved when the starting material for production is decrystallized low-substituted (DS 0.2 through 1.5) acetylated cellulose that is soluble in solvents or solvent systems based on dimethyl sulfoxide or dimethylacetamide. For this reason, derivatization with carbon disulfide need no longer be performed to dissolve the cellulose.

DETAILED DESCRIPTION OF THE INVENTION

In a stirred vessel, 15 to 35 vol % aqueous lye, preferably NaOH solution, is poured over pulp, which is obtained mostly from wood and is available commercially as a layered material, and is left to rest for approx. 1 hour. The lye is preferably used in at least a four-fold excess, based on the dry weight of the starting pulp.

The period of time can be less than one hour if prior tests have ensured that swelling of the pulp is complete.

Then the lye is removed by squeezing to such an extent that the weight of the remaining pressed cake is three times the dry weight of the starting pulp. This pressed cake is ground to particle sizes less than 3 mm in diameter by means of a conventional beater mill or shredder mill and loosened in the process.

The particles are then placed in a stirred vessel, where a five-fold quantity of a liquid agent that has an acetylating action on sodium cellulose, i.e., the particulate material, is poured over the particles, and the mass is stirred for approx. 60 minutes.

Examples of agents that can be used include acetic anhydride, glacial acetic acid (anhydrous acetic acid) or acetyl chloride.

This causes esterification of free OH groups of cellulose by acetyl groups up to an average degree of substitution (DS) of 0.2 to 1.5.

The average degree of substitution DS indicates the number of OH groups that are substituted on the average by the average of three hydroxyl groups of the individual cellulose molecule in its polymer chain. This yields a maximum value of 3 and a minimum value of 0 for the DS.

Next the excess substitution agent, i.e., the liquid phase, is squeezed out of the solid mass while the liquid is removed by suction. The residue, the cellulose derivative mass which is then in substituted form, is washed with water at least three times and then dried to a white powder at an ambient temperature of 100 C.

The cellulose derivative powder is then dissolved in a solvent or solvent system based on dimethyl sulfoxide or dimethylacetamide at 20 C. to 50 C. to a concentration of 4 to 12 wt %.

The preferred solvents (systems) have proven to be dimethyl sulfoxide (DMSO), DMSO/lithium chloride (chloride content 5 wt %), DMSO/magnesium chloride (chloride content 3 wt %), DMSO/N-methylmorpholine N-oxide or dimethylacetamide/lithium chloride. The inorganic chlorides serve as solubilizers. The dimethyl sulfoxide systems in particular have a good dissolving power, can be handled with no problems with regard to occupational safety and can be recovered easily from laboratory wastes.

Next, 100 to 500 wt % anhydrous salt which serves as the pore-forming agent is added to this solution, which is defined as 100 wt %. Such salts are known per se; they are soluble in water and weak acids and do not enter into any interaction with the cellulose derivative.

In addition, the solution is mixed with 0.5 to 4 wt % fibers of natural or synthetic origin that are insoluble in the solvent used and optionally with up to 5 wt % conventional dyes, preferably pigment dyes, and foaming substances.

The term "anhydrous" for the pore-forming salts is to be understood in the sense that they contain only bound water of crystallization at room temperature or none at all. One example is NaCl, which is available very inexpensively.

The resulting mixture is stirred or kneaded at room temperature until a homogeneous distribution of all components is obtained, which can be observed by the fact that when the dye is added it is distributed uniformly in the mixture. This process is usually concluded after 10 to 30 minutes.

The mixture is then poured or spread on a movable web, where the thickness of the applied layer is equal to the desired thickness of the sponge cloth to be produced. If it should have a surface structure, the web used will have a corresponding three-dimensional structure on the surface facing the mixture. The thickness of the applied layer is preferably a few millimeters up to three centimeters.

The coated web is passed through a bath of boiling water, where the dwell time in this bath depends on the amount of time required for complete dissolution of the pore-forming salt and for a spongy cohesive sheet to be formed on the web. The sheet can easily be lifted away as a raw product and is washed with water until no residues of the solvent system and free coloring agents can be detected. This is followed by drying at 100 C. to form a finished sponge cloth in a conventional moving or stationary drying apparatus.

One variant of the process consists of the fact that, after the spongy structure is treated with boiling water on the moving web, during or following the subsequent washing it is treated for one hour in 0.1 to 2 N aqueous sodium hydroxide solution at 50 C. while stirring. The acetyl groups present in the sponge are thus cleaved back and subjected to ester saponification. This process can also take place at room temperature, but the reaction is greatly accelerated at 50 C. and thus is more economical. The reaction can be carried out in an open apparatus. The pore structure of the cloth is not altered but this measure imparts the valuable property of extremely spontaneous wetting with water.

To obtain an especially voluminous and soft cloth, an inorganic carbonate or bicarbonate in the amount of 0.1 to 3 wt % may be added as the foaming agent to the mass applied to the web before the treatment in boiling water. Parallel to this, the boiling water contains an organic or inorganic acid in small quantities that are nevertheless sufficient to completely form carbon dioxide from the carbonate or bicarbonate. A pH of 6 or slightly less has proven adequate.

In addition to inexpensive sulfuric acid, acids of lower hazard classifications can also be used, such as citric acid.

Acetic anhydride has proven to be an especially suitable acetylating agent because it is available at a low cost.

The sponge cloth according to this invention does not contain any organic or inorganic sulfur compounds because sulfur atoms are not necessarily present in the solvent, where they remain chemically inactive.

Since there is no reduction in average degree of polymerization (DP) of the pulp used in this production method, raw materials with a high DP of up to 1200 can be used, so it is possible to produce sponge cloths that resist the mechanical forces that occur in processing without any loss of strength.

The corresponding properties of the end products can be determined in advance through the choice of raw materials with their DP values without having to take into account the DP degradation step which is difficult to control.

Except for boiling with water at the end of the process according to this invention, all the treatment steps can be carried out at room temperature.

No toxic vapors or wastewater is formed during the production process.

The cellulose derivatives can be stored even for several months in the solvents mentioned above without any change in DP.

The invention is illustrated in greater detail on the basis of the following example.

EXAMPLE

Commercially available pulp sheets with a DP of 1000 are shredded into small pieces. Of this, 500 g are placed in a 5 L glass beaker and excess 22% NaOH solution is poured over the shredded pieces. After 30 minutes, the soda lye is removed by suction through a glass frit and the remaining pulp is squeezed in a press at 50 bar.

The squeezed pulp is ground and excess acetic anhydride is poured over it in an apparatus equipped with a stirrer and a cooling device and stirred for half an hour. The solid mass is filtered out and rewashed with water until the pH of the wash water is neutral. Then the pressed cake is loosened, placed on a tray and dried at 100 C. until reaching a constant weight.

Then the DS is determined by saponifying the cellulose acetate with NaOH, titrating the excess NaOH back with HCl, and the DS is calculated from the NaOH consumption. A DS of 0.75 is obtained.

62.5 g of the dried cellulose acetate are placed first in a vessel and covered with 1250 g DMSO, stirred and dissolved. After 30 minutes, 10 g $MgCl_2$ are also added and likewise dissolved to make the color of the solution clearer.

This solution is transferred to a kneader. Then 16.7 g cotton fibers, 2 kg NaCl and 2 g sodium bicarbonate are added. Next the mixture is kneaded for 30 minutes. The homogeneous mass is spread on a profiled web and leveled out, and a profiled mating web is pressed against it to impart a structure to both sides of the paste. The web is boiled for 10 minutes in a water bath where a pH of 5 has been set with citric acid. The finished sponge cloth can be removed from the web; it separates easily from the web during the boiling process.

The cloth is washed again with water. Then the cloth is placed in 1 N NaOH solution and stirred for one hour at 50 C. to saponify the acetate groups again. A voluminous and soft cloth 7 mm thick with a density of 42 $kg/m^3$ is obtained.

When the DP is determined again, it shows according to DIN 54,270 (dissolving the cellulose in iron tartarate solution and determining the specific viscosity with and without cellulose) that any reduction in DP in comparison with the initial state does not exceed the tolerance of the measurement method.

To test for the impurities carbon disulfide and hydrogen sulfide which are usually present, 200 mL water and 10 mL concentrated phosphoric acid were poured over 5 g cloth and boiled for three hours, then gaseous substances were expelled with inert gas. Hydrogen sulfide is precipitated with zinc sulfate and carbon disulfide is adsorbed on active carbon. Analysis revealed no trace of either $CS_2$ or $H_2S$.

What is claimed is:

1. A sponge cloth, comprising modified cellulose and natural or synthetic fibers, wherein the cellulose is in decrystallized form, wherein the hydroxyl groups of the cellulose are substituted with acetyl groups, wherein the average degree of substitution (DS) is 0.2 to 1.5 and wherein no organic or inorganic sulfur compounds are present in the sponge cloth, said sponge cloth produced by a process comprising the steps of:

swelling a starting pulp obtained from wood in a stirred vessel by pouring 15 to 35% lye over the pulp;

leaving the pulp to soak for about one hour;

forming a pressed cake by squeezing out the lye until the weight of the pressed cake is about three times the dry weight of the starting pulp;

grinding the pressed cake by milling to particle sizes smaller than 3 mm in diameter;

pouring a liquid agent with an acetylating action on sodium cellulose over the ground pressed cake in a stirred vessel to form a reaction mixture;

stirring the reaction mixture for about 60 minutes;

squeezing liquid out of the reaction mixture and leaving a solid cellulose derivative mass while removing the liquid by suction;

washing the resulting cellulose derivative mass with water;

drying the cellulose derivative mass at about 100° C. to yield a cellulose derivative powder;

forming a solution by dissolving the cellulose derivative powder at 20° C. to 50° C. in a solvent system based on dimethyl sulfoxide or dimethylacetamide to a concentration of 4 to 12 wt %;

forming a mixture by adding to the solution, which is defined as 100 wt %
  a) 100 to 500 wt % of a water-soluble salt that is anhydrous at room temperature and is inert with respect to the cellulose derivative as a pore-forming agent;
  b) 0.5 to 4 wt % fibers that are insoluble in the solvent and
  c) up to 5 wt % coloring agents and foaming agents;

stirring or kneading the mixture at room temperature for 10 to 30 minutes until all components are distributed homogeneously;

pouring or spreading the mixture in a thickness equal to the thickness of the sponge cloth to be produced on a movable web and guiding the web with the mixture thereon through a bath with boiling water until a cohesive spongy sheet has been deposited;

separating the sheet from the web as the raw product;

washing the raw product with water resulting in a sponge cloth;

drying the resulting sponge cloth at about 100° C.

2. The sponge cloth according to claim 1, wherein after treating the spongy sheet with boiling water on the movable web, either during or following the subsequent washing, the spongy sheet is treated for about 1 hour with 0.1 to 2 N aqueous sodium hydroxide solution at 50° C. in an open vessel while stirring.

3. The sponge cloth according to claim 1, wherein the process further comprises addition of an inorganic carbonate or bicarbonate in an amount of 0.1 to 3 wt % to the mixture before boiling on the movable web and the addition of an organic or inorganic acid to the boiling water until achieving a maximum pH of 6.

4. The sponge cloth according to claim 1, wherein acetic anhydride is used as the acetylating agent.

5. The sponge cloth according to claim 1, wherein the solvent system is selected from the group consisting of dimethyl sulfoxide, dimethyl sulfoxide/lithium chloride, dimethyl sulfoxide/N-methylmorpholine N-oxide, and dimethylacetamide/lithium chloride.

* * * * *